United States Patent [19] [11] 4,080,972
Furlow [45] Mar. 28, 1978

[54] PIPE WITH STORAGE CHAMBER AND METHOD OF MAKING SAME

[76] Inventor: Robert C. Furlow, 12405 Falls Rd., Potomac, Md. 20854

[21] Appl. No.: 713,831

[22] Filed: Aug. 12, 1976

[51] Int. Cl.[2] ........................ A24F 1/26; A24F 15/00; A24F 23/04; B23B 1/00

[52] U.S. Cl. ................................ 131/180; 131/198 A; 144/93 R

[58] Field of Search ........... 131/180, 181, 172, 198 A; 144/93, 104

[56] References Cited

U.S. PATENT DOCUMENTS

| | | | |
|---|---|---|---|
| 864,307 | 8/1907 | Jones | 131/198 A |
| 906,328 | 12/1908 | Stevens | 131/180 |
| 1,213,021 | 1/1917 | Rogers | 131/180 |

*Primary Examiner*—Stephen C. Pellegrino
*Attorney, Agent, or Firm*—Bernard Stickney

[57] ABSTRACT

A pipe having an internal storage chamber is formed from a single block of wood. A peg located in the passageway between the storage chamber and a smoking bowl has the dual function of permitting the feeding of tobacco and modulating the air mixture for cooler smoking. A method of making the pipe by a sequence of drilling and routing steps.

8 Claims, 12 Drawing Figures

PIPE WITH STORAGE CHAMBER AND METHOD OF MAKING SAME

BACKGROUND OF THE INVENTION

The present invention relates to a smoking pipe construction having an integral, internal storage chamber and which also provides cooler smoking.

The provision of pipes with storage chambers for tobacco is well known but their constructions have generally been bulky and complicated as in U.S. Pat. Nos. 1,213,021, 2,402,914 and 2,156,171. The need for a simple, compact pipe with a storage chamber has not been met by the prior art.

Pipes, usually made of wood, are formed in two or more parts in which adhesives used for their assemblage may provide an undesirable taste.

Accordingly it is the principal object of this invention to provide a smoking pipe with a simple, integral, convenient storage chamber.

Another object of this invention is to provide a construction for modulating the air mixture for a cooler smoke.

It is a further object of this invention to provide a unitary, integral pipe made from a single block of wood.

A still further object of this invention is a method of drilling and routing smoking and storage passages for a pipe from a single block of wood.

BRIEF DESCRIPTION OF THE DRAWINGS

These and other objects and advantages of the invention will subsequently become apparent from the following detailed description when read in conjunction with the accompanying drawings wherein.

DETAILED DESCRIPTION OF THE INVENTION AND DRAWINGS

Figure 1:
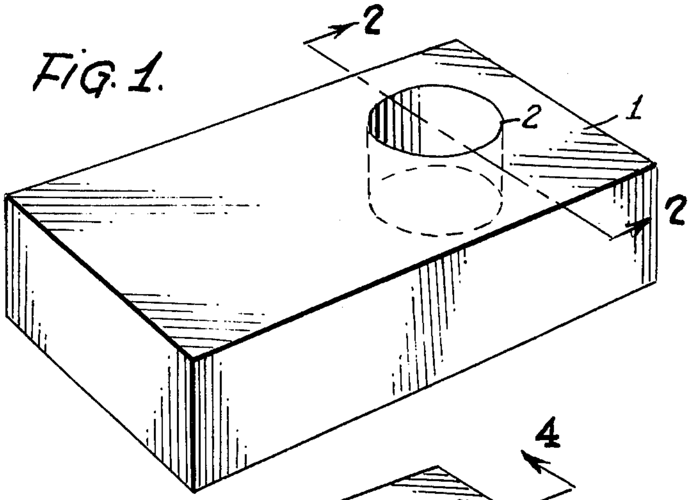
FIG. 1 is a perspective view of a starting block of wood with a bowl formed in it.
Figure 2:
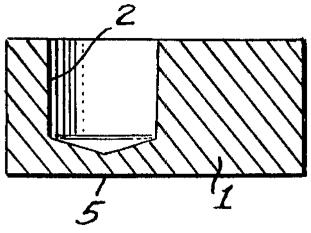
FIG. 2 illustrates a sectional view on line 2—2 of FIG. 1.

Referring now more specifically to the drawings, FIGS. 1 and 2 show a rough cut starting block of wood 1 which may be teak, walnut, fruitwood, briar or other hardwoods. In the following description preferred dimensions are given but the invention is not to be limited thereby. The block of wood should not exceed a length of 12 in., a thickness of 2 in. and a width of 3 in. A smoking bowl 2 is drilled with a ½ to ⅞ in. drill bit and is set to leave a space of 3/16 to 5/16 in. between the bottom of the bowl 4 and the bottom of the block 5.

Figure 3:
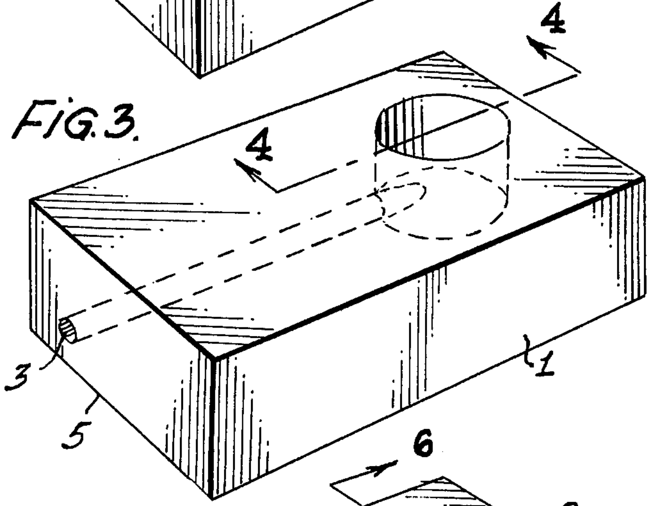
FIG. 3 is a perspective view of the block with a smoking passage added.
Figure 4:
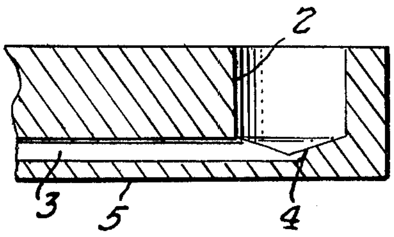
FIG. 4 illustrates a sectional view on line 4—4 of FIG. 3.

FIGS. 3 and 4 show the drilled stem hole 3. The drilling may be accomplished by using a variable speed hand drill with a ⅜ to 11/64 in. bit of sufficient length. The block may be hand held or located in a three point jig not shown. The drill should enter the block not more than ⅛ in. from the bottom 5 of the block and form a direct passage to the bottom 4 of the bowl 2.

Figure 5:
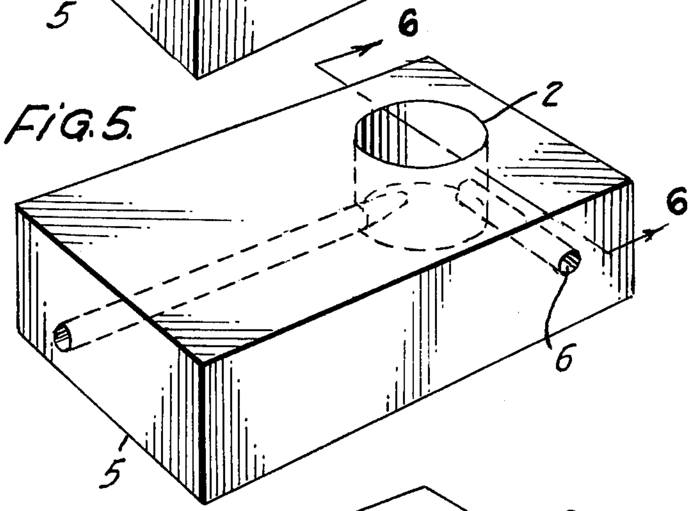
FIG. 5 is a perspective view of the block with a feed control passage added.
Figure 6:
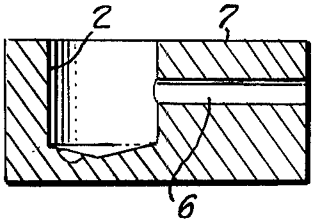
FIG. 6 illustrates a sectional view on line 6—6 of FIG. 5.

FIGS. 5 and 6 show the formation of a feed channel 6 to the bowl. Using a drill bit of ¼ to 5/16 in. and locating the block in the jig for use with a drill press, not shown, the channel is drilled to enter the bowl 2 not less than ⅛ in. from the top 7 of the block and not less than ¼ in. from the bottom of the bowl to permit the installation and use of a screen 8.

Figure 7:
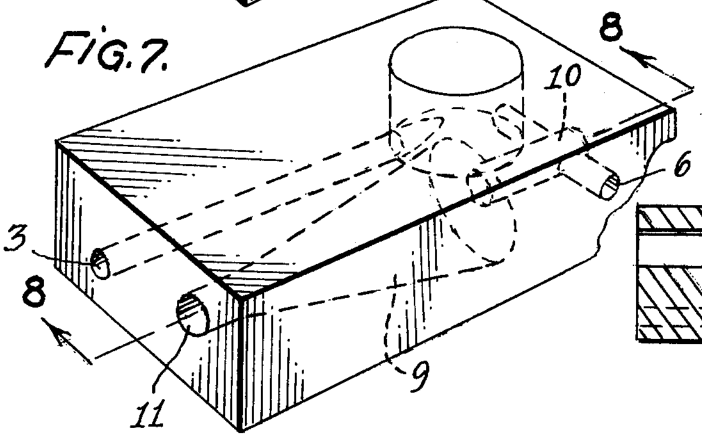
FIG. 7 is a perspective view of the block with a storage chamber added.
Figure 8:
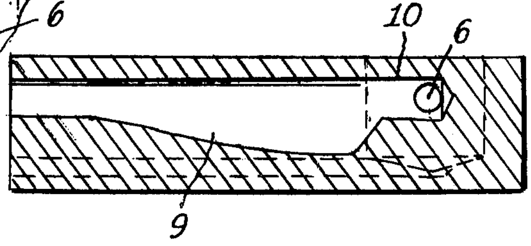
FIG. 8 illustrates a sectional view on line 8—8 of FIG. 7.

FIGS. 7 and 8 show the formation of the storage chamber 9 and a intersecting access channel 10 to the feed channel 6. Using a ¼ in. bit, a hole is drilled intersecting feed channel 6 at a minimum distance of 3/16 in. from the bowl 2. The drill bit is removed and then reintroduced into the entrance 11 of the hole whereupon a relative rocking motion between the block and drill bit is initiated so that the latter becomes an internal cutting edge. The bit is advanced with respect to the block while there is an increase in the rocking and rolling motion until chamber 9 is cut out. The chamber's edge 12 should be a minimum of ⅛ in. from the bowl.

Figure 9:
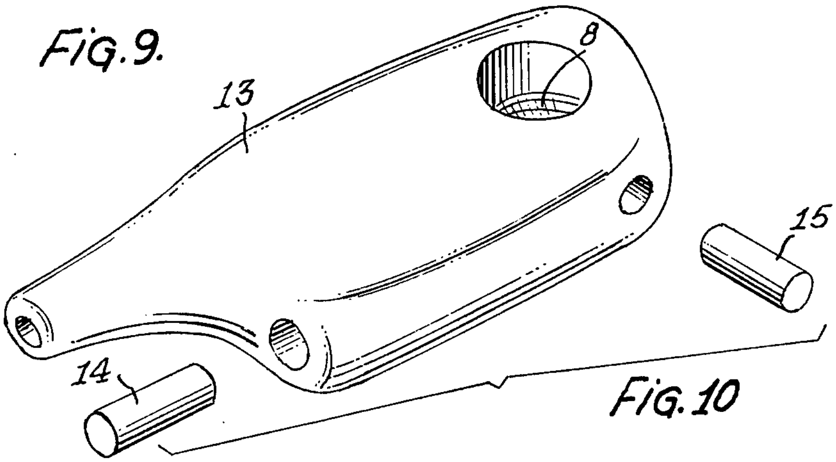
FIG. 9 is a perspective view of a finished pipe.
Figure 10:
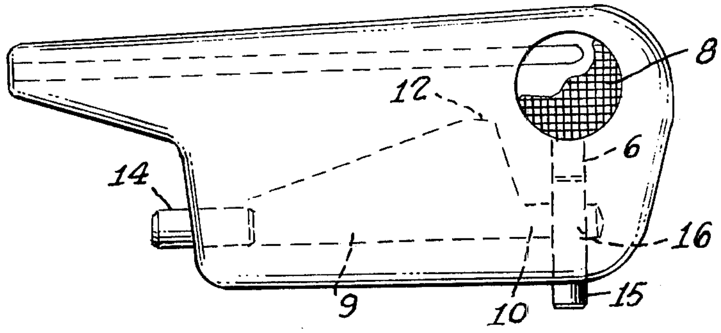
FIG. 10 is a top view of the pipe.
Figure 11:
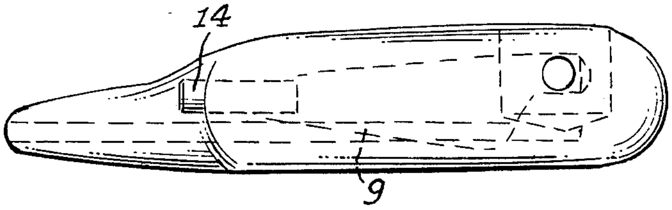
FIG. 11 is a side view of the pipe.

FIG. 9 shows a pipe 13 in which the block has been finished into its final form for smoking. Peg 14 is used to close the entrance to the storage chamber 9 while peg 15 is used to close the intersection of access channel 10 and feed channel 6. The peg 15 as seen in FIG. 10 is tapered as at 16 to provide another feature of the invention. Adjustment of the peg outwardly of feed channel 6 permits air to flow around the peg to bowl during smoking while it still functions to seal the contents in the storage chamber. The peg 15 may thus also be termed an air modulating device for providing a cooler smoke by allowing more air for a rapid burn.

Figure 12:
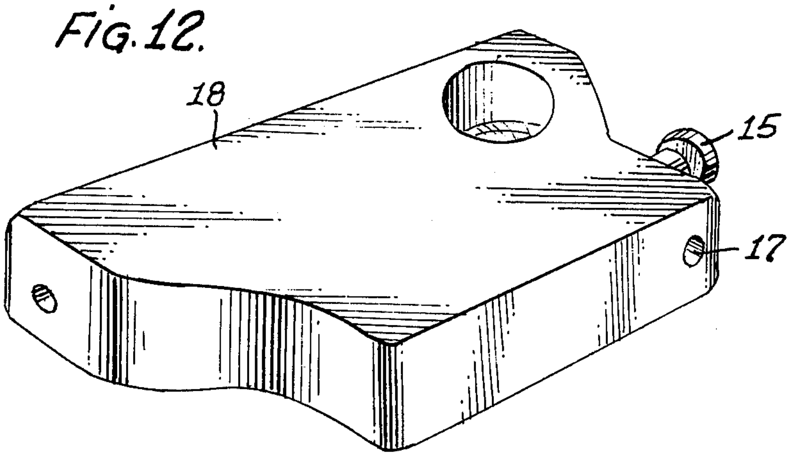
FIG. 12 is a perspective view of another modification of the pipe.

FIG. 12 shows another form of a pipe 18 in which the entrance to the storage chamber is on the opposite side of the pipe shown in FIG. 10. Peg 15 allows the storage chamber to be filled, also the feed therefrom to the bowl. A plug 17 permanently seals the end of feed channel 6.

The use of the smoking pipe of the present invention is readily apparant. Tobacco introduced into storage chamber 9 may be transferred to the bowl 2 through access channel 10 and feed channel 6 when peg 15 has been cleared of their intersection by merely tapping the pipe until the desired amount of tobacco is accumulated.

Further advantages of the present invention accrue from the one piece construction in that no adhesives are used. Nor are any shellacs or varnishes used on the finished natural wood surfaces which might also interfere with the smoking taste. While various changes may be made in the details of the construction, it is understood that such changes will be within the spirit and scope of the present invention.

I claim:

1. A smoking pipe comprising a unitary, integral wood construction having a bowl, a smoking passage means connected to said bowl, an internal storage chamber, passage means extending to the exterior wall of said pipe and connecting said chamber to said bowl, and means in said passage means to permit the feeding of tobacco which may be stored in said chamber to said bowl and to modulate the air mixture to said bowl.

2. A smoking pipe as defined in claim 1 wherein the passage means comprises an access channel from said storage chamber which intersects a feed channel leading to the bowl.

3. A smoking pipe as defined in claim 2 wherein the means in said passage means is a tapered peg in said feed channel and is of sufficient length to seal off said access channel when partially withdrawn so as to permit air to be introduced to the bowl.

4. A smoking pipe as defined in claim 1 wherein the means in said passage means is a tapered peg.

5. A smoking pipe as defined in claim 1 wherein said storage chamber has an opening to the outer surface of said pipe for introducting tobacco therein and means to close said opening.

6. A smoking pipe as defined in claim 5 wherein the means in said passage means is also the means to close said opening to the storage chamber.

7. A method of making a unitary, integral smoking pipe with a storage chamber from a single block of wood, comprising the steps of forming a smoking bowl in said block, drilling a stem hole to said bowl, drilling a second hole to said bowl, drilling a third hole to intersect said second hole, introducing a rotating drill bit in said third hole and by a relative rocking and rolling motion cutting an internal storage chamber.

8. The method of claim 7 wherein a tapered peg is formed and is inserted in said second hole.

* * * * *